(12) United States Patent
Glinz et al.

(10) Patent No.: US 6,672,349 B1
(45) Date of Patent: *Jan. 6, 2004

(54) VEHICLE WHEEL WITH A PNEUMATIC TIRE

(75) Inventors: Michael Glinz, Neustadt (DE); Horst Sergel, Hannover (DE); Hans-Bernd Hellweg, Seelze (DE); Heinrich Huinink, Garbsen (DE)

(73) Assignee: Continental Aktiengesellschaft, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,776

(22) Filed: Feb. 23, 1998

(30) Foreign Application Priority Data

Feb. 24, 1997 (DE) .......................... 197 07 090

(51) Int. Cl.$^7$ .............................. B60C 17/06
(52) U.S. Cl. .................. 152/156; 152/158; 152/247; 152/251; 152/252
(58) Field of Search ................. 152/156, 158, 152/340.1, 341.1, 342.1, 518, 520, 5, 11, 12, 379.4, 381.4, 381.5, 247, 248, 249, 250, 251, 252, 254, 256, 269, 270, 271, 273, 274

(56) References Cited

U.S. PATENT DOCUMENTS

| | | | | |
|---|---|---|---|---|
| 637,469 A | * | 11/1899 | Lavanchy | 152/249 |
| 676,395 A | * | 6/1901 | Heath | 152/248 |
| 728,106 A | * | 5/1903 | Hockman | 152/248 |
| 833,437 A | * | 10/1906 | Broome | 152/248 |
| 1,454,036 A | * | 5/1923 | Brown | 152/158 |
| 2,754,876 A | * | 7/1956 | King | 152/341.1 |
| 3,990,491 A | * | 11/1976 | Hampshire et al. | 152/520 |
| 4,177,849 A | | 12/1979 | Osada et al. | |
| 4,216,810 A | | 8/1980 | Osada et al. | |
| 4,346,747 A | * | 8/1982 | Osada et al. | 152/520 |
| 4,592,403 A | | 6/1986 | Stein et al. | |

FOREIGN PATENT DOCUMENTS

| | | |
|---|---|---|
| DE | 956380 | 1/1957 |
| DE | 2537055 | 3/1976 |
| DE | 3507046 | 8/1986 |
| DE | 4323247 | 1/1995 |
| FR | 2282346 | 3/1976 |
| GB | 2000733 | 1/1979 |

OTHER PUBLICATIONS

Copy of a German Office Action dated Oct. 27, 1997 prepared in connection with German Patent Application No. 197 11 241.2.

* cited by examiner

Primary Examiner—Adrienne C. Johnstone
Assistant Examiner—Barbara J Musser
(74) Attorney, Agent, or Firm—Greenblum & Bernstein, P.L.C.

(57) ABSTRACT

Vehicle wheel that includes a pneumatic tire mounted on a wheel rim. The pneumatic tire includes a tire tread, two side-walls, a carcass, reinforcing elements, and two tire beads with bead cores. The vehicle wheel also includes an emergency support body, mounted on the wheel rim and positioned inside the pneumatic tire. The emergency support body includes an emergency rolling surface to support the tire in case of a failure of the pneumatic tire. The emergency rolling surface includes a radially exterior surface of a ring torus with a bowl-shaped cross section, and the ring torus includes axially exterior sections having cross-sectional contours with first curvatures open to the wheel rim and an intermediate section positioned between the axially exterior sections having a contour with a second curvature open to a crest point of the pneumatic tire. The first and second curvatures include at least one radius of curvature and at least one supporting element is positioned to support the ring torus on the wheel rim.

33 Claims, 4 Drawing Sheets

VEHICLE WHEEL WITH A PNEUMATIC TIRE

CROSS-REFERENCE TO RELATED APPLICATIONS

The present application claims priority under 35 U.S.C. §119 of German Patent Application No. 197 07 090.6, filed on Feb. 24, 1997, the disclosure of which is express incorporated by reference herein in its entirety.

BACKGROUND OF THE INVENTION

1. Scope of the Invention

The present invention relates to a vehicle wheel with a pneumatic tire mounted on a wheel rim. The vehicle tire includes a tire tread, two side-walls, a carcass, reinforcing elements, and two tire beads with bead cores. The vehicle tire also includes an emergency support body mounted on the wheel rim. The emergency support body is arranged inside the pneumatic tire to provide an emergency rolling surface to support the tire in the event of failure.

2. Discussion of Background Information

A vehicle wheel similar in general to one discussed above is provided with an emergency support body as disclosed, e.g., in German Patent Application No. DE 35 07 046. In this wheel, an emergency roll frame is comprised of an exterior, metallic reinforcement ring and a cushion ring arranged between the reinforcement ring and the wheel rim. While the cushion ring provides relatively good radial flexing, the combination of an insufficient axial fixture with the substantially planar cross-section metallic reinforcement ring demonstrates a disadvantage that, during an emergency, the lateral guide forces or cohesive forces, which prevent an unseating or peeling off of the tire from the wheel rim, cannot be exerted in a satisfactory manner.

Taking the lateral guide forces into account, an optimized solution is shown, e.g., in German Patent No. DE 956 380, which shows a vehicle wheel with an emergency support body formed as a completely rigid metal piece connected to the wheel rim. The vehicle wheel also shows a peripheral notch in the emergency rolling surface to engage a toothed, inward-facing projecting part of the running surface sub-structure. In the event of an emergency, a form-fitting shape is created in the axial direction, between the emergency roll frame and the tire, so that the tire bead is prevented from stripping off the wheel rim. A disadvantage of a vehicle wheel provided with such an emergency roll frame is the additional weight that arises from the toothed and inward-facing rubber bead to be inserted in the slot and the weight of the emergency rolling surface bolted together with a two-piece wheel rim in an elaborate manner. Further, only a metal elastic flexing is possible for the emergency roll, so that a very "hard" and uncomfortable rolling occurs in the event of a breakdown.

In the two above-mentioned arrangements, and with other emergency support bodies known in the prior art, another disadvantage is that, due to an unfavorable load distribution during the introduction of forces acting on the periphery of the emergency support body, load peaks can occur on the wheel rim sufficient to deform the wheel rim.

SUMMARY OF THE INVENTION

The present invention provides a vehicle wheel for pneumatic tires with an emergency support body. During an emergency roll, the emergency support body may maintain the drive pattern that continues to be safe and maintain a sufficiently resilient rolling motion and may safely transfer lateral guide forces without an excessive increase in weight. The emergency support body may also provide a load distribution to substantially prevent acting forces from damaging the wheel rim.

The emergency rolling surface is formed by a radially exterior surface of a ring torus with a bowl-shaped cross section. The ring torus axially extends from an axial center of the wheel rim to both sides of the rim, i.e., over a partial area of the wheel rim width. The ring torus has a cross-sectional contour in its axially exterior sections that forms a first curvature open to the wheel rim, i.e., radially inward, and a cross-sectional contour in a section between the axially exterior sections that forms a second curvature open to the a highest point of the tire, i.e., radially outward. The first and second curvatures may include one or several inter-connecting radii of curvature and the ring torus with a bowl-shaped cross-section may be supported on the wheel rim by one or several supporting elements. The reinforcement can occur directly on the wheel rim, at gliding units adapted to the wheel, or via guide rollers and roller bearings, so that friction during an emergency run is minimized.

Through the contour, which essentially involves dividing the emergency rolling surface into two shoulder regions and a more or less highly pronounced recoil region, a rolling behavior of the tire, i.e., in the event of a break down, results in accordance with the curvature shape, the curvature and the force absorption and elasticity characteristics of the support elements. While these characteristics are different from the normal case, the tire, under emergency conditions, maintains the ability to drive the vehicle, while only slightly differing from handling during normal running conditions.

The ability to absorb lateral guide forces is especially pronounced in the present invention. This is due to the recoil provided in the middle regions of the emergency rolling surface that enable the middle sections of the tire tread or the sub-structure to conform to the curvature. Thus, with respect to lateral forces, the tire of the present invention creates a form-fitting shape that reduces the tensile forces affecting the side-walls to a level that is safe for the driving conditions. In this manner, peeling of the tire bead from the wheel rim is substantially prevented. Further, the radii of curvature of neighboring portions of the emergency surface are designed to gradually merge with each other and to work with the tread thickness of the tire to substantially prevent point loads or linear loads that could destroy the tire tread.

A further advantage of a ring torus with a bowl-shaped cross-section provided with curvatures, as discussed above, is that during an emergency roll, very high point loads, e.g., running over a sidewalk or curb, may be absorbed. Further, through the increased rigidity and shape of the ring torus with a bowl-shaped cross-section, an even load distribution is provided that is not detrimental to the wheel rim.

Generally, the ring torus with a bowl-shaped cross section is formed to axially and symmetrically extend from an equatorial plane of the tire, i.e., an axial center, over a portion of the width of the wheel rim. However, when utilized in vehicles with a steep king pin angle, i.e., with a steeply inclined positioning of the wheels, symmetrical contouring may not be necessary and the areas of curvature to the inclination angle of the tires may be accordingly adjusted.

Considering the compromise between weight optimization and rolling behavior, an advantageous embodiment of the present invention is that the axially exterior sections, i.e., with the first curvatures, rise at most to one-half, and preferably up to one-third, of the tire cross-sectional height of the tire. In a tire size of, e.g., 195/65 with a wheel rim diameter of 15 inches, the first curvatures may be spaced 42 mm from the wheel rim shoulder. Thus, a sufficient height of two-thirds of the tire cross-sectional height is available for normal driving operations and the flexing that occurs there.

In conjunction with another embodiment of the present invention, the ring torus, in the region of the second curvature, has a minimum diameter greater than a diameter of wheel clinch devices. Further, the emergency support bodies of the present invention are easily adjustable to conventional tire sizes and wheel rim dimensions. In this manner, during an emergency roll, excessive flexing in the lateral sections of the tire may be substantially prevented.

In an advantageous embodiment of the present invention, the supporting elements may be formed to extend from the axially exterior sections and as substantially planar annular disks supported on the wheel rim.

Depending on manufacture of the emergency frame is as a single piece or as multiple parts, one advantage, i.e., from a manufacturing standpoint, lies in that a press or a roll-molding process may be utilized proceeding from a ring-like edge, or a forming or injection process can be utilized with simple tools. Another advantage of the present invention is that, with respect to the assembly, the emergency roll frame can be conformed or adapted to a shape and width of the wheel rim in a particularly easy manner. Further, the suspension behavior or characteristics of the emergency roll frame may be influenced as a function of the support body.

Several adjoining annular disks can, e.g., be utilized as supporting elements and angled toward the axial center of the vehicle wheel. Each disk may be positioned at an angle directed inward toward the axle or outward away from the axle, e.g., shaped like a spring washer set. In this manner, another possibility exists for the adjustability with respect to the elastic force absorption capability of the emergency support body.

In an advantageous embodiment of the present invention, an annular disk may be coupled to the ring torus, as an extension of the axially exterior section. The annular disk may be positioned at an angle of, e.g., between approximately 75° and 90°, and preferably at approximately 83° to the wheel axis. In this manner, a cross-sectional view of shows a smooth transition from the contour of the ring body to the planar annular disk without any ridges being created or formed.

The joint effect of the curvature of the emergency rolling surface and the flexible brace (planar annular disk) positioned at an angle of approximately 83° to the axle axis is sufficient for a good emergency rolling behavior. Further, because of the relatively steep degree of inclination of the planar annular disk, a minimum of material is required to form the emergency support body. This, reduces the weight of the tire.

With respect to usage on special vehicles, e.g., on two-wheel vehicles, it can be advantageous to form the supporting elements as one or more support rings positioned between the ring torus and the wheel rim. Thus, it is possible to design emergency support bodies for narrow wheel rims. Further, stability can be advantageously improved when the support elements are formed substantially across the width of the ring torus.

In an embodiment having a plurality of supporting elements positioned between the ring torus and the wheel rim, the wheel rim may be advantageously formed to have reduced elasticity in the transition areas to create of an articulation point. With the possibility of an elastic bending of the supporting elements, the present invention enables a simple assembly of the emergency support body on integral standard wheel rims.

The supporting elements may be formed to secure seating of the tire beads, even in an event of failure. The supporting elements may be supported on the wheel rim in the areas neighboring the tire beads to serve as tire bead securing devices. In this manner, the humps and the projecting parts are simplified, thereby reducing the manufacturer' costs.

An advantageous embodiment of the present invention is that the supporting element and the ring torus may be made of the same material, preferably aluminum or alloyed aluminum. This enables manufacturing to be easier and simpler, and also enables later sorting and separation of remaining materials, e.g., for recycling, to be performed with low expenditure.

An embodiment made of aluminum may require a two-piece wheel rim or a pre-shaped wheel rim, which, after mounting the tire and emergency support body, is processed to its final shape and size.

In a further embodiment, in which the supporting elements and the ring torus demonstrate varying elasticities, the supporting elements may be made of, e.g., rubber elastic or elastoplastic material and the ring torus may be made of, e.g., aluminum or aluminum alloy. In this case, because of the well-moldable rubber elastic materials of the supporting elements, normal standard wheel rims can be used. This enables a simple refitting of vehicle wheels already in operation is made possible.

The supporting elements may be made of, e.g., viscoelastic, elastoplastic or viscoplastic materials. These materials may be adjusted in their characteristics by using various polymer and rubber mixtures with different fillers and additives.

Polyurethane foams or other elastomeric foams, for example, can be used as elastic rubber materials.

The alloy AlMnSi 08 has been shown to be an effective aluminum material, such that the ring torus is formed, for the most part, with a thickness of, e.g., between approximately 4 and 6 mm, and the rubber elastic or elastoplastic materials of the supporting elements are formed with a thickness of, e.g., approximately 8 mm.

In another advantageous design, the support elements may be made of elastic rubber material and the ring torus may be composed of a synthetic material that is comparatively harder than elastic rubber or elastoplastic material, i.e., composed of a synthetic material with a higher modulus of elasticity and greater firmness. In the injection molding process, this may prove advantageous in simplifying manufacturing procedure because only one more material mixture must be fed into the available mold via one or several supplementary nozzles during the injection in accordance with the bi-injection or co-injection process. In this manner, the gradient for the consistencies and the elasticities may be controlled.

This advantageous design can be further refined, in that the ring torus may be composed of fiber-reinforced synthetic material. In such cases, available injection molds or synthetic material female molds may be partially lined, e.g., with fiberglass mats. After this arrangement, only one short injection process is necessary for production.

Naturally, the use of synthetic materials in place of aluminum reduces the overall weight. This weight reduction has a further advantage that the optimal combination of material can be provided for each respective type of transport vehicle and for stress by weight on the wheels.

The bonding of the various materials with each other may be provided via gluing, vulcanization, cross-linking, or via interlocking of forms hooked into each other. In this regard, the appropriate bonding method can be chosen for each design from the many methods available. In the event that particularly stable all-metal designs of the emergency support bodies are necessary, e.g., as with wheels for heavy-duty government vehicles, an advantageous design exists if the support elements are composed of spring steel and the ring torus is composed of aluminum. This results in a high loading capacity of the emergency support body with a simultaneous, relatively modest increase in the weight of the wheel.

Besides the use and design of elastic material characteristics of the support elements, another advantageous design of the present invention exists when the support elements demonstrate humps, slots, or notches that have a suspension effect in the radial direction. In this event, components of the support elements which are elastic in shape may be used for providing an optimized, comfortable rolling behavior.

The present invention may provide an emergency support body formed as a surrounding ring torus with a bowl-shaped cross-section that includes at least two sections that are arched radially outwards and are separated from each other by a radial contraction (depression). The at least two axially exterior peripheral areas provide the necessary support.

Such an emergency support body, which is generally only made out of one material, may already include support elements in its lateral areas and may be easily adapted in any relation whatsoever to the lateral forces and stress on its emergency rolling surface during an emergency run. The single-piece design also allows a simple molding process and, thus, cost-effective manufacturing.

In another advantageous design, the ring torus may be reinforced with support ribs located on its under side and directed toward the wheel rim. The support ribs may run in a circumferential or axial direction. Such a design allows peak loads to be absorbed and a further saving of weight by reducing the wall thickness in less strained areas.

Likewise, a pure alteration or adaption of the wall thickness of the emergency support body can also help to enable weight minimization, e.g., either in the areas of the support elements or over the axial extension of the ring torus with a bowl-shaped cross section.

Further, an emergency support body in accordance with the present invention may be utilized fastened to a wheel rim inside a pneumatic vehicle tire.

Accordingly, the present invention is directed to a vehicle wheel that includes a pneumatic tire mounted on a wheel rim. The pneumatic tire includes a tire tread, two side-walls, a carcass, reinforcing elements, and two tire beads with bead cores. The vehicle wheel also includes an emergency support body, mounted on the wheel rim and positioned inside the pneumatic tire. The emergency support body includes an emergency rolling surface to support the tire in case of a failure of the pneumatic tire. The emergency rolling surface includes a radially exterior surface of a ring torus with a bowl-shaped cross section, and the ring torus includes axially exterior sections having cross-sectional contours with first curvatures open to the wheel rim and an intermediate section positioned between the axially exterior sections having a contour with a second curvature open to a crest point of the pneumatic tire. The first and second curvatures include at least one radius of curvature and at least one supporting element is positioned to support the ring torus on the wheel rim.

In accordance with another feature of the present invention, the axially exterior sections may radially extend from the rim a distance less than approximately one-half of a cross-sectional tire height. Further, the axially exterior sections may radially extend from the rim a distance less than approximately one-third of a cross-sectional tire height.

In accordance with another feature of the present invention, the second curvature of the intermediate section may have a minimum diameter greater than an exterior diameter of wheel rim clinch devices.

In accordance with still another feature of the present invention, the at least one supporting element may include a substantially planar disk ring mounted to the wheel rim and may form extensions of the axially exterior areas. Further, the at least one supporting element may include a plurality of disk rings coupled to each other, and each disk ring may be positioned at an angle to a wheel axis. Alternatively, the substantially planar disk ring may include an annular disk coupled to extend from the axially exterior section of the ring torus without the creation of a ridge and the annular disk may be positioned at an angle between approximately 75° and 90° to a wheel axis. In another alternative, the at least one support element may be supported on the wheel rim in an area adjacent the tire beads to secure the tire bead to the rim.

In accordance with a further feature of the present invention, the at least one support element may be composed of at least one support ring positioned between the ring torus and the wheel rim. Further, the at least one support ring may be further positioned substantially along a width of the ring torus. Alternatively, the at least one support rings may have areas of reduced elasticity for coupling with the ring torus to create an articulation point.

In accordance with another feature of the present invention, the at least one support element may be composed of one of rubber elastic and elastoplastic material and the ring torus may be composed of one of aluminum and an aluminum alloy.

In accordance with still another feature of the present invention, the at least one support element may be composed of one of rubber elastic and elastoplastic material and the ring torus may be composed of a synthetic material harder than the material composing the at least one support element. Further, the ring torus may be composed of a fiber-reinforced synthetic material. Still further, the at least one support element may be composed of one of rubber elastic and elastoplastic material and having a wall thickness greater than a wall thickness of the ring torus.

In accordance with a further feature of the present invention, the ring torus may be composed of aluminum and the at least one support element may be composed of spring steel.

In accordance with a still further feature of the present invention, the at least one support element includes at least one of humps, slots, and notches that produce a radially directed suspension effect.

The present invention is directed to a vehicle wheel that includes a pneumatic tire mounted on a wheel rim. The pneumatic wheel includes a tire tread, side walls, a carcass, reinforcing elements, tire beads with bead cores. The vehicle wheel also includes an emergency support body, mounted on the wheel rim and positioned inside the pneumatic tire, that includes an emergency rolling surface to support the pneumatic tire in case of failure. The emergency support body includes a surrounding ring torus with a bowl-shaped cross section having at least two radially outwardly arched sections forming axially exterior peripheral areas separated from each other by a radial depression and the emergency support body is supported over both axially exterior peripheral areas.

In accordance with another feature of the present invention, the vehicle wheel further includes ribs for reinforcing the ring torus being located on an under side of the ring torus. The ribs may be positioned to point toward the wheel rim and extending in one of a circumferential and axial direction.

In accordance with another feature of the present invention, the emergency support body may be composed of one of aluminum and aluminum alloy.

The present invention is directed to an emergency support body for use in a pneumatic vehicle tire. The emergency support body includes a ring torus with a bowl-shaped cross section. The ring torus has axial end sections including radially outwardly arched sections and an intermediate section coupling the axial end sections. The emergency support body also includes support elements coupled to extend from the axial end sections and adapted to be coupled to a rim of a vehicle tire.

In accordance with another feature of the present invention, the support elements may extend from the axial end sections such that, when mounted to the rim, the support elements form an angle of between approximately 75° and 90° to a rim axis.

In accordance with another feature of the present invention, the support elements may be arranged to divergently extend from the axial end sections.

In accordance with still another feature of the present invention, the support elements may include a spring washer set.

In accordance with a further feature of the present invention, the support elements may include two adjoining annular disks. Further, the two adjoining annular disks may be directed inwardly.

In accordance with a still further feature of the present invention, the support elements may include an annular disk. Further, the annular disk may include a hump, which may be directed inwardly.

In accordance with yet another feature of the present invention, the emergency support element may include ribs extending from the ring torus in one of a radial and axial direction.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
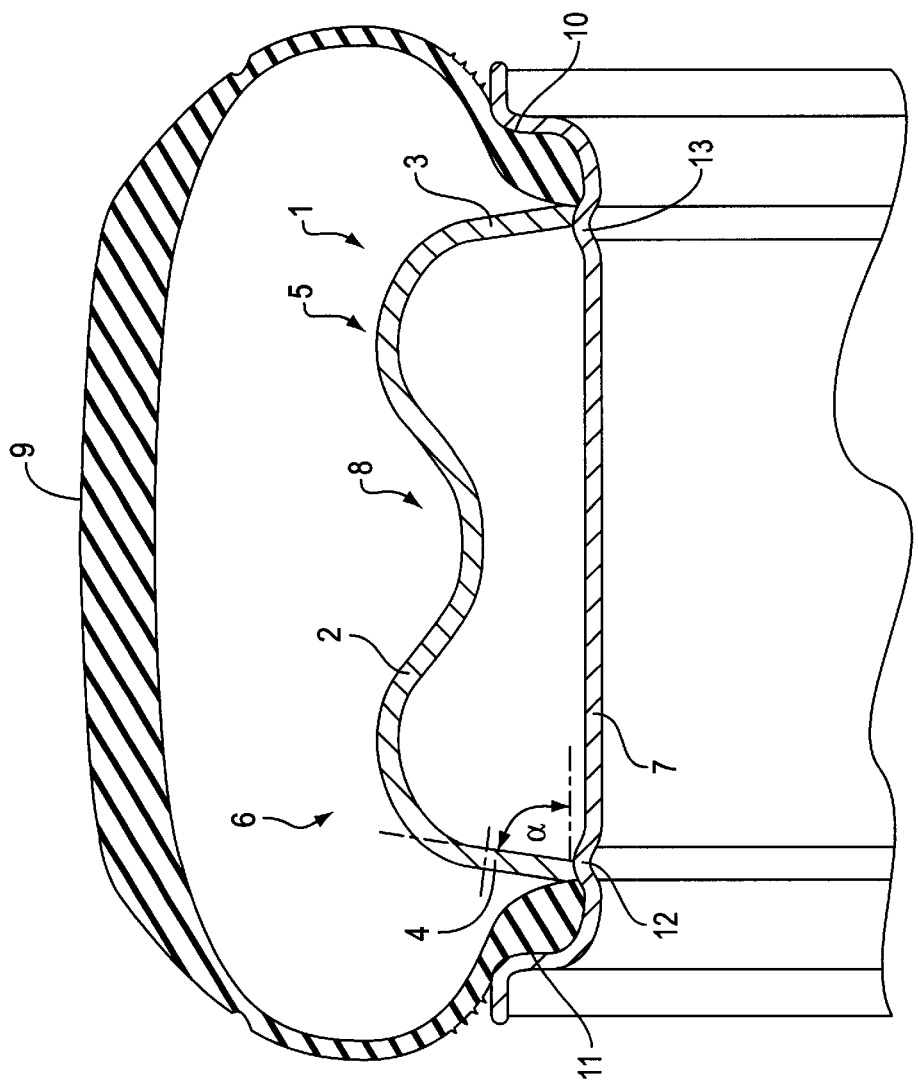
FIG. 1 illustrates a single-piece emergency support body made of aluminum, in accordance with the present invention.

In FIG. 1, an emergency support body 1, which is composed, in cross-section, of a ring torus 2 with a bowl-shaped cross-section and support elements 3 and 4. Ring torus 2 may include two axially exterior sections (areas) 5 and 6 that are each contoured radially outwardly, i.e., with an curvature that is open (downwardly) to a wheel rim 7. An intermediate section (area) 8 may be provided to couple exterior areas 5 and 6. Section 8 may be contoured as a radial depression, i.e., with a second curvature open (upwardly) to a crest point of a tire 9.

The curvatures of sections 5, 6, and 8 may formed as inter-connecting radii of curvature such that the curvatures of sections 5 and 6 smoothly merge into the contours of section 8 and into support elements 3 and 4 without creating or forming a ridge. Support elements 3 and 4 may be, e.g., substantially planar annular disks that are supported on portions of wheel rim 7 adjacent tire beads 10 and 11.

The disks of support elements 3 and 4 may be positioned or inclined at an angle $\alpha$ to the rim axis, which may be between, e.g., approximately 75° and 90°, preferably approximately 83°. The disks may also be inclined toward an axial center of the rim.

The surfaces of support elements 3 and 4 in contact with wheel rim 7 may conform or be adapted to a shape of humps 12 and 13 of wheel rim 7. In this manner, the tire beads 10 and 11 may be additionally secured for normal driving, and, in the event of an emergency, the tire beads remain secured to rim 7.

In accordance with the exemplary embodiment shown in FIG. 1, ring torus 2 may be symmetrically formed relative to the tire width.

Figure 2:
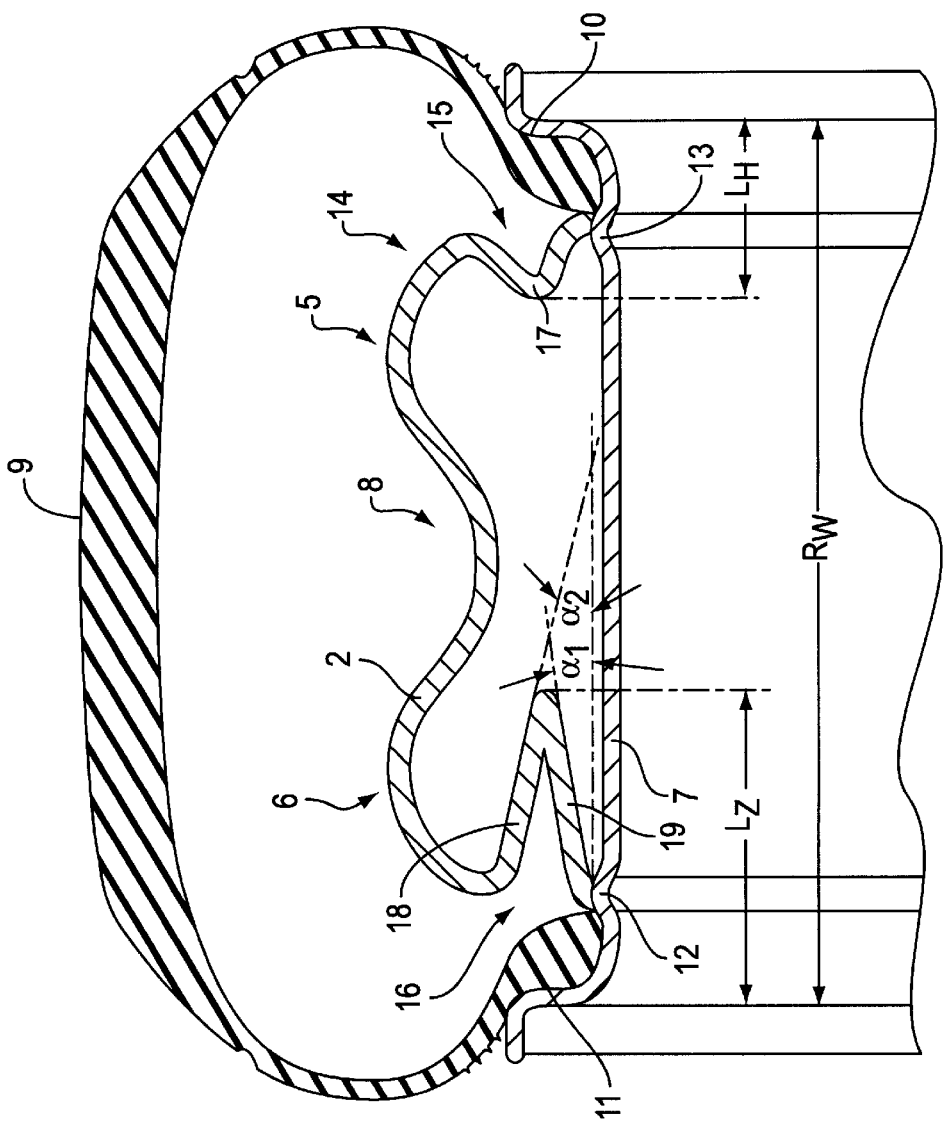
FIG. 2 illustrates a single-piece emergency support body in accordance with the present invention that includes support elements enabling additional form elasticity.

FIG. 2 illustrates an emergency support body 14 in accordance with the present invention. This embodiment differs from emergency support body 1 depicted in FIG. 1 in that alternative support elements are coupled to both axial exterior ends 5 and 6 of ring torus 2 with a bowl-shaped cross section. Specifically, on the right side of the axial centerline, a support element 15 is utilized, whereas on the left side of the axial centerline, a support element 16 is utilized.

Support element 15 may be formed with an annular disk coupled to extend from axially exterior end section 5 of ring torus 2. Support element 15 may include a hump 17 that provides form-elastic characteristics as well as material elastic characteristics. Hump 17 may extend inwardly toward the axial center of the tire rim such that an innermost point of the hump $L_H$ extends inward no more than approximately 25% of a rim width $R_W$.

Support element 16 may be formed as a significantly more pronounced form elastic portion that includes two adjoining annular disks 18 and 19. Adjoining disks 19 and 18 may be coupled to each other to form angles of inclination $\alpha_1$, and $\alpha_2$ to the rim axis. Accordingly, adjoining annular disks 18 and 19 may substantially form a spring washer set that enables an extremely high and completely reversible elasticity in support element 16. In the exemplary embodiment shown in FIG. 2, $\alpha_1$, and $\alpha_2$ are, e.g., less than approximately 45° to the wheel axis, and preferably approximately 30° to the wheel axis. Further, annular disks 18 and 19 may extend inwardly toward the axial center of the rim such that an inner point of inflection $L_I$ extends inward not more than, e.g., 40% of rim width $R_W$.

Further, support elements 15 and 16 may be positioned in a region of tire beads 10 and 11 and on wheel rim 7 to create additional securing of the tire bead.

As noted, both support elements of ring torus 2 may be designed differently. In this manner, when the wheel is in a sharply diagonal position, the interior support element may include a hump.

Figure 3:
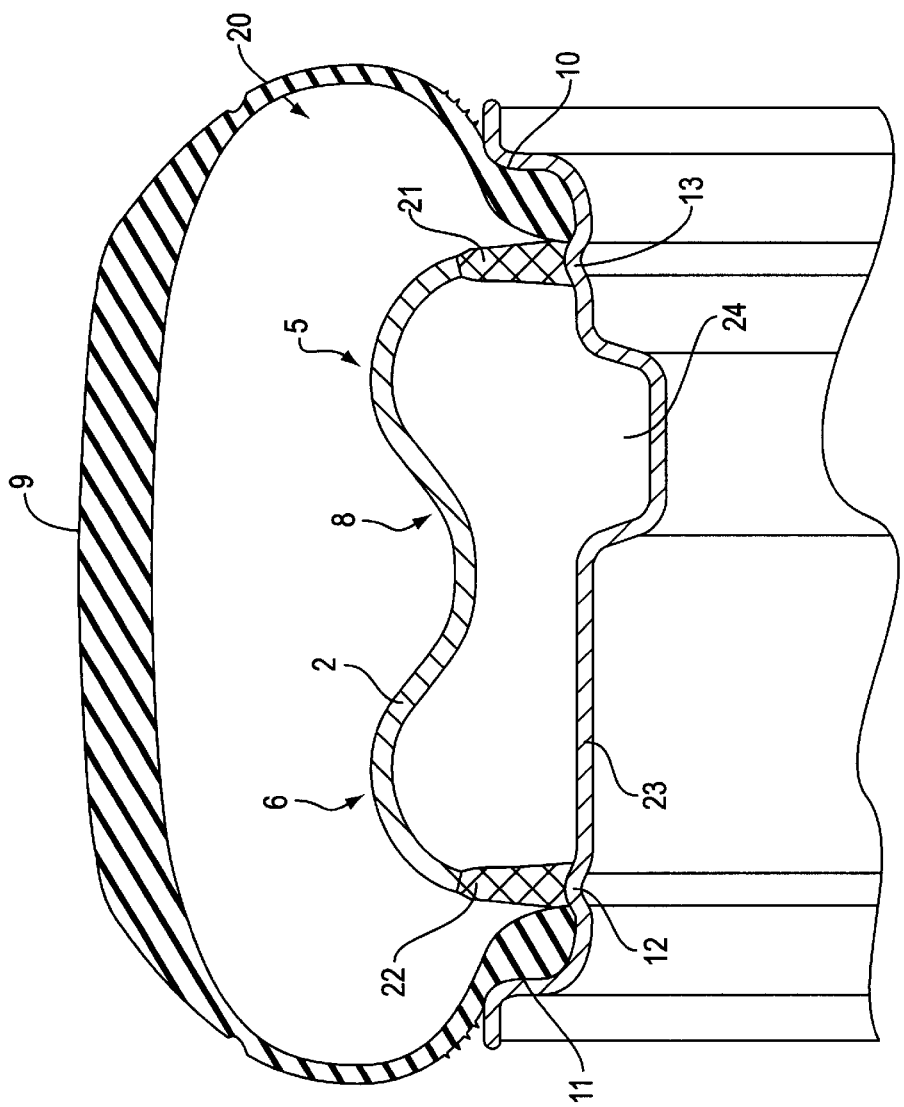
FIG. 3 illustrates an emergency support body made of two different materials.

FIG. 3 illustrates an emergency support body 20 coupled at its axially exterior sections to support elements 21 and 22. Support elements 21 and 22 may be formed as annular disks composed, e.g., of an elastic rubber material. Ring torus 2 with a bowl-shaped cross section may be composed, e.g., of an aluminum alloy.

While the exemplary embodiments depicted in FIGS. 1 and 2 are shown mounted on wheel rim 7. Wheel rim 7 may be either preformed in two pieces or simply pre-shaped so that after mounting emergency support body 1 or 14 and tire 9, the tire may be shaped to its final dimension. Further, emergency support body 20, as shown in FIG. 3, may be applied to a standard wheel rim 23 with a drop-base 24.

The thickness of rubber elastic support bodies 21 and 22 may be, e.g., approximately 8 mm in their base areas, which is greater than the thickness of the aluminum material forming ring torus 2, which may be, e.g., between approximately 4 and 6 mm. The increasing wall thickness of the elastic rubber material toward its base enables secure support of emergency support body 20 and the ability to re-shape the assembly on standard wheel rim 23.

Further, the exemplary embodiment of FIG. 3 illustrates advantageous footing surfaces of support elements 21 and 22 mounted to wheel rims 23. However, it is not necessary to form or adapt support element 21 and 22 for proper seating on humps 12 and 13 of tire rim 23. That is, humps 12 and 13, which are provided to secure the tire bead in rim 23, may be conformed to by flexing of the elastic rubber material of support elements 21 and 22.

Figure 4:
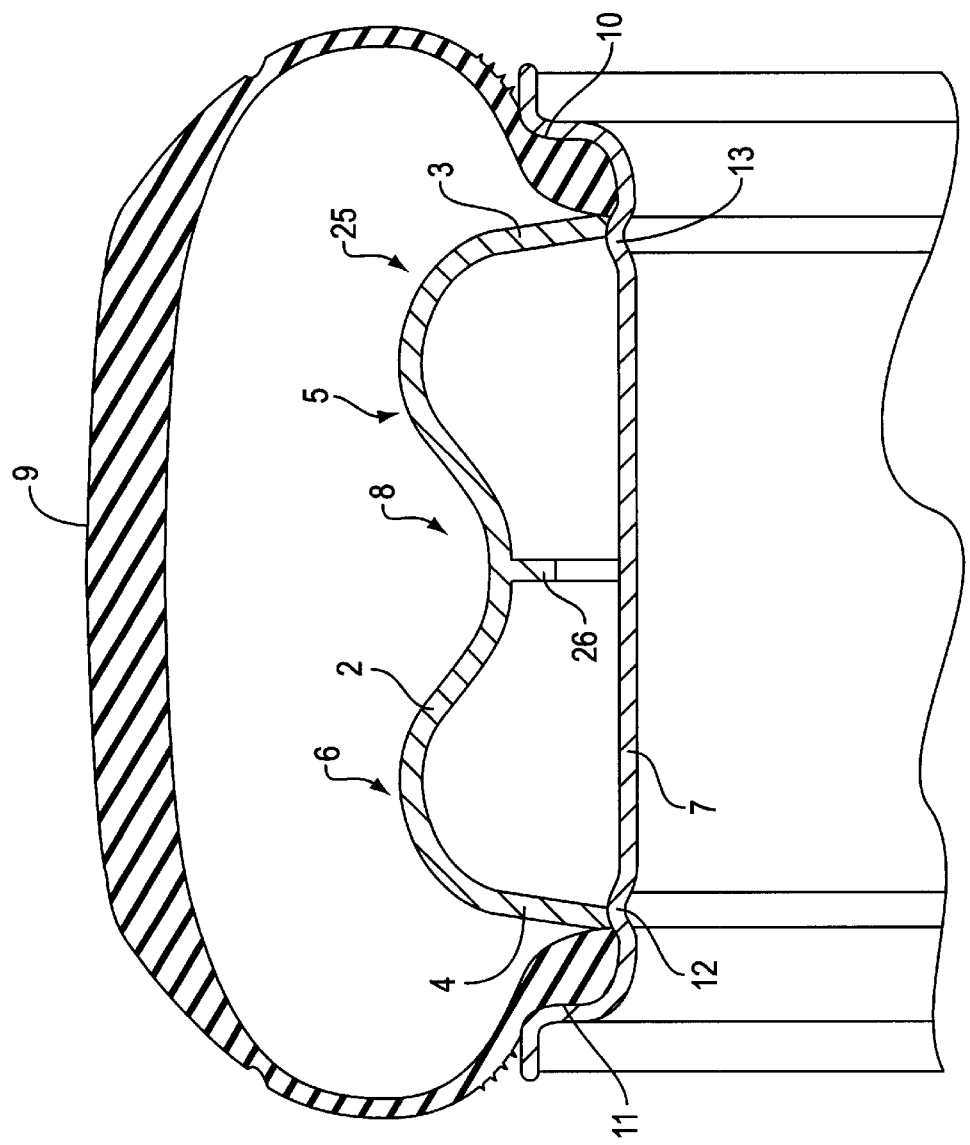
FIG. 4 illustrates a single-piece emergency support body with a surrounding reinforcement rib in a central section.

FIG. 4 illustrates an emergency support body 25 that is substantially similar to emergency support body 1 depicted in FIG. 1. In this exemplary embodiment, emergency support body 25 may be composed of a ring torus with a bowl-shaped cross section 2 with support elements 3 and 4 extending from axially exterior sections 5 and 6. Support elements 3 and 4 may be composed of substantially planar annular disks mounted on the wheel rim.

In contrast to the previously discussed emergency support bodies 1, 14, and 20, emergency support body 25 includes a reinforcing rib 26 extending from section 8 toward the rim axle. In this manner, ring torus 2 may be utilized to withstand higher loads.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

Reference List

1. Emergency support body
2. Ring torus with a bowl-shaped cross section
3. Support element
4. Support element
5. Axially exterior area
6. Axially exterior area
7. Wheel rim
8. Area of curvature opening to the tire crest
9. Tire
10. Tire Bead
11. Tire Bead
12. Hump
13. Hump
14. Emergency support body
15. Support element
16. Support element
17. Hump
18. Annular disk
19. Annular disk
20. Emergency support body
21. Support element
22. Support element
23. Standard wheel rim
24. Drop-base
25. Emergency support body
26. Reinforcing rib

What is claimed:

1. A vehicle wheel comprising:

a pneumatic tire mounted on a wheel rim, the pneumatic tire including a tire tread, two side-walls, a carcass, reinforcing elements, and two tire beads with bead cores;

an emergency support body, mounted on the wheel rim and positioned inside the pneumatic tire, including an emergency rolling surface to support the tire in case of a failure of the pneumatic tire;

the emergency rolling surface comprising a radially exterior surface of a ring torus with a bowl-shaped cross section, the ring torus being composed of a rigid material;

the ring torus comprising axially exterior sections having cross-sectional contours with first curvatures open to the wheel rim and an intermediate section positioned between the axially exterior sections having a contour with a second curvature open to a crest point of the pneumatic tire, wherein, when deflated, the tire is capable of riding on the first and second curvatures;

the ring torus being formed to maintain its cross-sectional contours during an emergency roll;

the first and second curvatures including at least one radius of curvature; and supporting elements positioned to resiliently support the ring torus on the wheel rim.

2. The vehicle wheel in accordance with claim 1, the axially exterior sections radially extending from the rim a distance less than approximately one-half of a cross-sectional tire height.

3. The vehicle wheel in accordance with claim 1, the axially exterior sections radially extending from the rim a distance less than approximately one-third of a cross-sectional tire height.

4. The vehicle wheel in accordance with claim 1, the second curvature of the intermediate section having a minimum diameter greater than an exterior diameter of wheel rim clinch devices.

5. The vehicle wheel in accordance with claim 1, at least one of the supporting elements comprising a substantially planar disk ring mounted to the wheel rim, and forming extensions of the axially exterior areas.

6. The vehicle wheel in accordance with claim 5, the at least one of the supporting elements comprising a plurality of disk rings coupled to each other, and each disk ring being positioned at an angle to a wheel axis.

7. The vehicle wheel in accordance with claim 5, the substantially planar disk ring comprising an annular disk coupled to extend from the axially exterior section of the ring torus without the creation of a ridge; and the annular disk being positioned at an angle between approximately 75° and 90° to a wheel axis.

8. The vehicle wheel in accordance with claim 5, the at least one of the supporting elements is supported on the wheel rim in an area adjacent the tire beads to secure the tire bead to the rim.

9. The vehicle wheel in accordance with claim 1, at least one of the supporting elements being composed of at least one support ring positioned between the ring torus and the wheel rim.

10. The vehicle wheel in accordance with claim 9, the at least one support ring being further positioned substantially along a width of the ring torus.

11. The vehicle wheel in accordance with claim 9, the at least one support rings having areas of reduced elasticity for coupling with the ring torus to create an articulation point.

12. The vehicle wheel in accordance with claim 1, at least one of the supporting elements being composed of one of rubber elastic and elastoplastic material and the ring torus being composed of one of aluminum and an aluminum alloy.

13. The vehicle wheel in accordance with claim 1, at least one of the supporting elements being composed of one of rubber elastic and elastoplastic material and the ring torus being composed of a synthetic material harder than the material composing the at least one support element.

14. The vehicle wheel in accordance with claim 13, the ring torus being composed of a fiber-reinforced synthetic material.

15. The vehicle wheel in accordance with claim 14, the at least one of the supporting elements being composed of one of rubber elastic and elastoplastic material and having a wall thickness greater than a wall thickness of the ring torus.

16. The vehicle wheel in accordance with claim 1, the ring torus is composed of aluminum and at least one of the supporting elements is composed of spring steel.

17. The vehicle wheel in accordance with claim 1, at least one of the supporting elements includes at least one of humps, slots, and notches that produce a radially directed suspension effect.

18. The vehicle wheel in accordance with claim 1, wherein at least one of the supporting elements is positioned to resiliently support each axially exterior peripheral area.

19. A vehicle wheel comprising:

a pneumatic tire mounted on a wheel rim, the pneumatic wheel including a tire tread, side walls, a carcass, reinforcing elements, tire beads with bead cores;

an emergency support body, mounted on the wheel rim and positioned inside the pneumatic tire, that includes an emergency rolling surface to support the pneumatic tire in case of failure;

the emergency support body comprising a surrounding ring torus composed of a rigid material with a bowl-shaped cross section having at least two radially outwardly arched sections forming axially exterior peripheral areas separated from each other by a radial depression, wherein, when deflated, the tire is capable of riding on the outwardly arched sections and the radial depression;

the ring torus being formed to maintain the bowl-shaped cross section in an emergency roll; and the emergency support body being resiliently supported over both axially exterior peripheral areas by at least two supporting elements.

20. The vehicle wheel in accordance with claim 19, further comprising:

ribs for reinforcing the ring torus being located on an under side of the ring torus; and the ribs positioned to point toward the wheel rim and extending in one of a circumferential and axial direction.

21. The vehicle wheel in accordance with claim 19, the emergency support body being composed of one of aluminum and aluminum alloy.

22. The vehicle wheel in accordance with claim 19, wherein the at least two supporting elements are arranged such that at least one supporting element is located to resiliently support each axially exterior peripheral area.

23. An emergency support body for use in a pneumatic vehicle tire comprising:

ring torus with a bowl-shaped cross section structured to be insertable into the pneumatic vehicle tire;

the ring torus having axial end sections comprising radially outwardly arched sections and an intermediate section coupling the axial end sections;

the axial end sections and the intermediate section being capable of supporting the tire during an emergency roll;

the ring torus being constructed to maintain the bowl-shaped cross section during an emergency roll; and support elements, wherein at least one support element is coupled to extend from each axial end section and the support elements are capable of being coupled to a rim of a vehicle tire, wherein the support elements are arranged to resiliently support both axial end sections.

24. The emergency support body in accordance with claim 23, the support elements extending from the axial end sections such that, when mounted to the rim, the support elements form an angle of between approximately 75° and 90° to a rim axis.

25. The emergency support body in accordance with claim 23, the support elements arranged to divergently extend from the axial end sections.

26. The emergency support body in accordance with claim 23, the support elements comprising a spring washer set.

27. The emergency support body in accordance with claim 23, the support elements comprising two adjoining annular disks.

28. The emergency support body in accordance with claim 27, the two adjoining annular disks being directed inwardly.

29. The emergency support body in accordance with claim 23, at least one of the support elements comprising an annular disk.

30. The emergency support body in accordance with claim 29, the annular disk comprising a hump.

31. The emergency support body in accordance with claim 30, the hump being directed inwardly.

32. The emergency support body in accordance with claim 23, further comprising ribs extending from the ring torus in one of a radial and axial direction.

33. The emergency support body in accordance with claim 23 in combination with the pneumatic vehicle tire, whereby the ring torus is positioned within the pneumatic tire.

* * * * *